(12) United States Patent
Stenger et al.

(10) Patent No.: US 6,580,064 B1
(45) Date of Patent: Jun. 17, 2003

(54) BACKGROUND REJECTION CIRCUIT

(75) Inventors: Markam F. Stenger, Ridgecrest, CA (US); Alan D. Woodson, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 06/132,466

(22) Filed: Mar. 25, 1980

(51) Int. Cl.⁷ .......................... H01J 40/14; G01D 5/36; G01J 5/02; F41G 7/00
(52) U.S. Cl. .......... 250/214 B; 244/3.16; 250/214 AG; 250/233; 250/340; 250/351
(58) Field of Search .................. 250/214 B, 214 C, 250/214 AG, 340, 351, 233; 244/3.16, 3.17

(56) References Cited

U.S. PATENT DOCUMENTS

| | | | | |
|---|---|---|---|---|
| 3,372,230 A | * | 3/1968 | Wurz | 358/113 |
| 3,859,530 A | * | 1/1975 | Brewster | 250/334 |
| 3,946,222 A | * | 3/1976 | Swanberg | 250/233 |
| 4,103,847 A | * | 8/1978 | Thomas et al. | 244/3.16 |
| 4,115,006 A | * | 9/1978 | Reymond et al. | 250/214 B |

* cited by examiner

*Primary Examiner*—Stephen C. Buczinski
(74) *Attorney, Agent, or Firm*—David Kalmbaugh

(57) ABSTRACT

A background rejection circuit uses the harmonic content of an angularly narrow target to produce a signal. The signal is used to modulate an externally derived audio signal to produce a target indication signal free of background noise.

10 Claims, 2 Drawing Sheets

BACKGROUND REJECTION CIRCUIT

BACKGROUND OF THE INVENTION

1. Field of the Invention

This invention pertains to the field of electronics. More specifically, this invention pertains to the field of electro-optics. In greater particularity, the invention pertains to an electronic detector of infrared energies. By way of further characterization, by without limitation thereto, the invention shall be described as it pertains to any audio circuit for use in a missile guidance system.

2. Description of the Prior Art

It is known in the missile electronics arts to use a audio signal derived from a detected target to indicate target acquisition or various other missile readiness perimeters. Generally, these signals are derived from the missile signal obtained from the target itself. That is, incoming radiation from the target is modulated by a suitable reticle and pre-photocell optical system such that a characteristic modulation is impressed upon the signal for processing purposes. This signal is then amplified and used to indicate the presence of such a target. A difficult problem exists in a relatively narrow angular target in the presence of background radiation.

Prior attempts to solve this problem have utilized various bucking circuits or separate background and target modulators such that the target signal is indicated by characteristic frequencies or other characteristics imposed upon the target by its position within the field of view of the missile or its position on the reticle.

SUMMARY OF THE INVENTION

The present invention uses the harmonics generated by a signal of small angular dimensions to indicate the presence of a target in a background of other radiation. A bandpass filter filters this target energy limiting it to the harmonic content produced by such a small target interacting with the reticle as an initial target signal. This signal is detected and fed to a summing amplifier where it is mixed with a guidance control system audio signal to produce an output in the presence of a target signal. The output of the summing amplifier is connected to a spin frequency filter to develop a sinusoidal output of the desired audio frequency. This output is fed to a multiplier where it modulates a second audio signal to produce an enhanced audio output which is indicative of the acquisition of a target signal.

OBJECTS OF THE INVENTION

Accordingly, it is an object of this invention to provide an electronic circuit to produce an audio signal upon the reception of a target having predetermined angular dimensions.

A further object of this invention is to provide an electronic circuit for the production of enhanced audio signal.

A still further object of this invention is to provide an electronic circuit for use in a missile guidance system to indicate the presence of a target signal.

These objects, as well as other objects, advantages, and novel features of the invention will become apparent from the following detailed description of the invention when considered in conjunction with the accompanying drawings wherein:

DESCRIPTION OF THE PREFERRED EMBODIMENT

Figure 1:
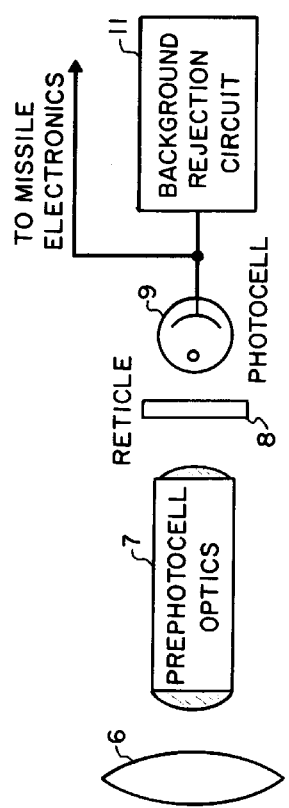
FIG. 1 is an elementary schematic of the invention in an operational environment.

Referring to FIG. 1, radiation from an area containing the target is passed to the interior of a missile by means of an optical systems indicated at 6 as a simple convex positive lens. The pre-photocell optical system 7 focuses the radiation from the target area upon a reticle 8 positioned along the optical axis from pre-photocell optics 7. Thus, lens 6 and pre-photocell optics 7, together, comprise an acceptance optical system. By relative movement of pre-photocell optics 7 and reticle 8, together with the motion of the missile, the image of a target appearing in the field of view of lens 6 is caused to be chopped or otherwide interrupted by the action of reticle 8. This chopping action is conventional in the art and may be affected by movement of either pre-photocell optics 7 or reticle 8.

The chopped optical signal is detected by a photocell symbolically indicated at 9. The output of the photocell is connected to missile target detection and guidance electronics as is conventional in the art and also connected to a background rejection circuit 11.

Because the target is of small angular dimensions its image is abruptly occulted by reticle 8, whereas radiation from objects having a relatively large angular extent pass characteristic radiation patterns which are relatively unaffected by the fine line structure of reticle 8.

As is well understood by those in the electronics arts, the abrupt turning off and on of the illumination from the small angular target as seen by photocell 9 produces an electrical output which is rich in harmonic content of the interruption frequency whereas the relatively more continuous illumination afforded by objects of large angular dimensions in the background produce little high frequency harmonics. The invention circuit utilizes the presence of these high frequency harmonics to indicate the presence and give some idea of the relative size of the target.

In order to aid operational personnel to position the target within the acceptance field of the acceptance optical system an audio tone is conventionally utilized to indicate the presence of such a target. Background rejection circuit 11 serves this purpose of accentuating the signal produced by the small angle target while leaving the background, or non-target, radiation relatively unaffected.

Figure 2:
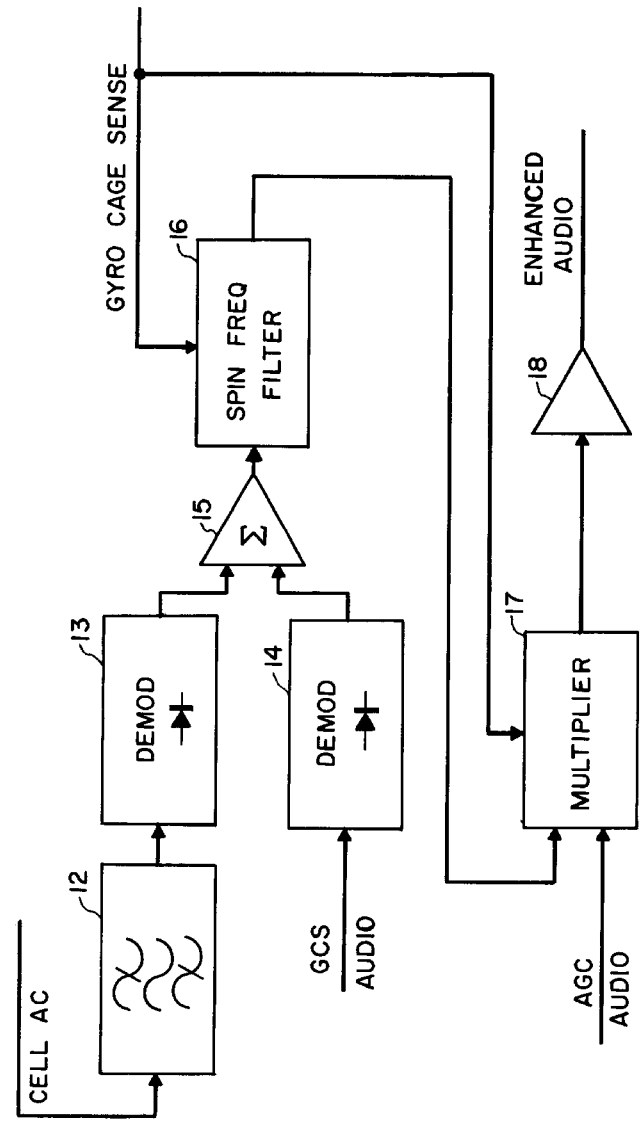
FIG. 2 is a block diagram of the background rejection circuit of FIG. 1.

Referring to FIG. 2, a block diagram indicates a preferred fashion for accomplishing these desirable objectives. As shown, the alternating current from photocell 9 is connected to the input of a bandpass filter 12. Bandpass filter 12 is a sharply tuned, narrow-band filter which passes only the high frequency harmonics produced by the small angle target. The output of filter 12 is connected to a demodulator circuit 13. Demodulator circuit 13 produces an output which is coupled to a summing amplifier 15. The output from demodulator 13, although previously used to generate an audio signal to be used as a target acquisition signal, has a low amplitude because of the relatively small amount of power in the high frequency harmonics when the target is weak. Therefore, the amplification of this signal by itself produces little background rejection because of the noise always present with this type of device. This is because the harmonic content of a weak signal is low.

To overcome this problem, an internal audio signal from the guidance portion of the missile is also fed to amplifier 15 by means of a suitable demodulator 14. The guidance system audio, abbreviated GCS audio, is conventionally present in many missile systems but, for the purpose of this application, need be considered only as a source of audio frequency electrical energy. In practice, the frequency is commonly derived from a commentator like signal associated with the relative movement of the pre-photocell optics 7 and reticle 8. Of course, other sources of audio energy may be utilized.

For strong signals, the harmonic content is high and the detected signal provides the necessary enhancement, a modulating signal.

Amplifier 15 has a threshhold adjustment such that the GCS audio signal fed to it by demodulator 14 is insufficient, by itself, to produce an output. However, in the presence of a signal from demodulator 13, an output is produced. Of course, such an output is present only when a target having the necessary high frequency harmonics is processed.

The output of summing amplifier 15 is further processed by a spin frequency filter 16 which is a synchronous filter utilizing the up and down guidance control signals from the guidance and control section of the missile to produce a relatively smooth sinusoidal wave having a frequency associated with the reticle-optical spin rate. This frequency is termed "spin frequency" and is a characteristic of most modern electro-optically guided missiles. The spin frequency output, which is readily recognized by operational personnel familiar with the missile electronics, is fed to a multiplier 17 which may be conceptionalized as a non-linear modulator along with an audio energy signal indicated as AGC audio to produce a modulated audio tone output which may be further amplified and processed by a suitable amplifier 18. Thus, the system provides a circuit producing the familiar tone of the spin frequency and produces such a tone without the annoying presence of background generated tonial information such that it may be clearly recognized by operational personnel when at a low level and in high noise environment.

Because the enhanced target audio signal is unnecessary once guidance has been obtained, that is the missile has "locked-on" the target, the circuit of FIG. 2 has been constructed to receive a gyro cage sensing signal from the guidance and control system of the missile to cut off the passage of the enhanced audio signal when the gyro guidance signal is in the condition that it is tracking the target. This provides an operational convenience and an audible indication to operational personnel that "lock-on" has occured.

Figure 3:
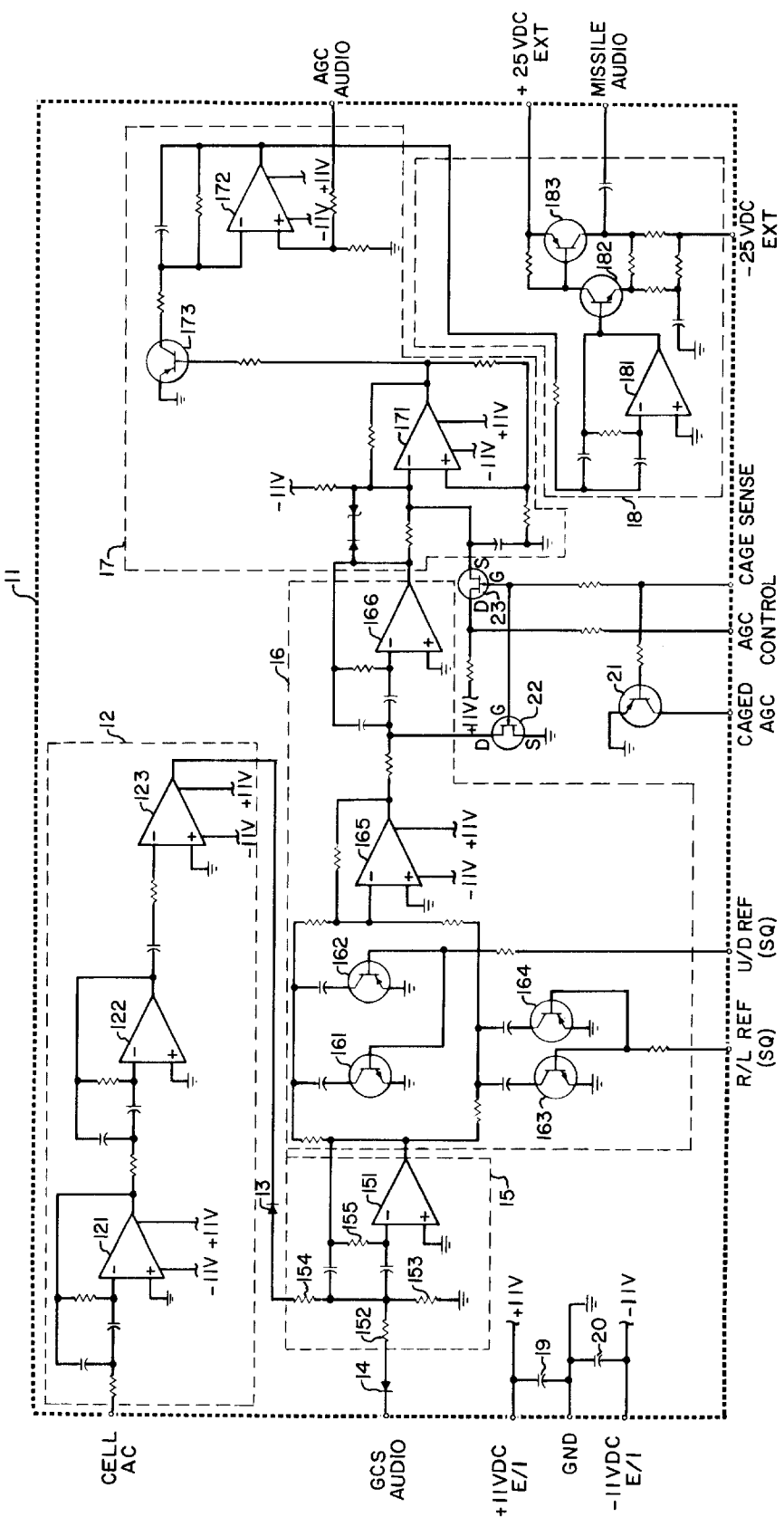
FIG. 3 is a schematic diagram of the circuit of FIG. 2.

Referring to FIG. 3, a schematic representation of an actual implementation of the circuit of FIG. 2 is illustrated. As shown, active filter 12 comprises two operational amplifiers 121 and 122 with frequency limiting feedback circuity to provide for the requisite narrowpass-band. The output is capacitively coupled to an operational amplifier 123 for amplitude and impedance control. The output of amplifier 123 constitutes the output of filter 12 and is connected to a diode demodulator 13.

The output of diode 13 is connected to summing amplifier 15 which includes an operational amplifier 151 together with a resistive signal integrator comprising resistors 152, 153, 154, and 155. The GCS audio signal is connected via diode 14 to resistor 152 which is in series with resistor 153 to constitute a voltage divider, the output of which is capacitively coupled to amplifier 151. Similarly, resistor 154 is connected in series with resistor 153 and provides a similar voltage dividing function for the output of demodulator diode 13. The gain of the amplifier is controlled by the appropriate selection of the values of the resistors including resistor 155 in the feedback control circuit of amplifier 151.

The output of summation amplifier 15, as previously explained, is connected to a spin frequency filter 16. Spin frequency filter 16 is an active filter and includes operational amplifiers 165 and 166 which are connected in series. The output is fed to amplifier 165 by means of a conventional resistance coupling network and a plurality of solid state devices indicated at 161, 162, 163, and 164. These transistors serve as synchronizing inputs for the guidance signals such as the right-left reference signal connected to transistors 163 and 164 and the up-down reference signals connected to transistors 161 and 162. As shown, the polarity construction of the transistor pairs associated with the right-left guidance signal and the up-down guidance signal are opposite to allow for each pair to process signals having positive and negative voltage polarities. Of course, if a single polarity were used for this purpose, a single transistor having the requisite construction could provide for this bias control.

Multiplier 17 which receives the output of spin frequency filter 16 includes an operational amplifier 171 which is connected as a pulse width modulator. The output of amplifier 171 is connected to an operational amplifier 172, via a transistor 173, to provide for a polarity inversion and necessary impedance matching. Amplifier 172 is connected as a conventional difference amplifier and receives an AGC audio signal on one terminal and the output of pulse width modulator 171 to produce an output in accordance with the average difference of the voltage on these two terminals in the well understood fashion. This signal then corresponds to a tone modulation of the AGC audio signal in the pattern determined by the output of pulse width modulator 171.

The output from multiplier 17 is connected to an amplifier 18 which includes an operational amplifier 181 connected as a straight amplifier and a plurality of impedance matching and gain controlling transistors 182 and 183. Transistors 182 and 183 serve to provide the necessary audio power and impedance matching characteristics for utilization by the system in the well understood fashion.

When "lock-on" is obtained, the output from circuit 11 is squelched by means of a bias control system. This control system selectively applies a bias to operational amplifier 166 and spin frequency filter 16 and to pulse width modulator 171 and multiplier 17. This switching is performed by a plurality of transistors 22–23 in response to a cage sense signal connected to the gates thereof.

Transistor 21 is used to change the level at which the carrier amplifier (front end) AGC operates. The audio circuit requires a reduction or limiting of the AGC audio signal, which is the output of the front end. When the seeker is caged, the cage sense signal is low. This turns transistor 21 on and biases the AGC so as to limit AGC audio at a lower level than normal. This replaces, and is more accurate than, an earlier circuit which used a diode clipper circuit to limit AGC audio. When the seeker is uncaged, transistor 21 is turned off and the AGC operates normally.

When the seeker is uncaged, modulation of missile audio is undesirable, so the modulating signal is shorted out by transistor 22. At the same time transistor 23 turns on. This allows the AGC control signal (a DC level) to control the volume of missile audio so a hotter target, which produces a higher level at AGC control, will produce a higher volume at the missile audio output.

The aforegoing circuit shows how the desired objects of the invention may be implemented in a conventional missile environment by the utilization of conventional components and circuity techniques. As will be recognized by those versed in the art, such as circuit may be miniaturized such that it occupies a minimal space in the compact guidance system of a modern aerial missile. Of course, using well understood engineering tradeoffs, circuit modifications may suggest themselves to those versed in the art.

The foregoing description taken together with the appended claims and drawings constitute a disclosure such as to enable a person skilled in the electronics and aerial missile arts and having the benefit of the teachings contained therein to make and use the invention. Further, the structure herein described meets the objects of invention and generally constitutes a meritorious advance in the art unobvious to such a worker not having the benefit of these teachings.

We claim:

1. A photo-electric processing system comprising:

an acceptance optical system for passing radiation therethrough;

a reticle positioned with respect to said optical system to chop radiation passed thereby;

an electro-optical transducer positioned with respect to said reticle to produce an electrical analog of said chopped radiation;

a processing circuit connected to said electro-optical transducer for enhancing a signal from a source of radiation of small angular dimensions and including, a first filter having an input connected to said electro-optical transducer and having an output, a first source of audio frequency electrical energy, a summing circuit having an input connected to the output of said first filter and an input connected to said first source of audio frequency electrical energy and having an output, a second filter having an input connected to the output of said summing circuit and having an output, a second source of audio frequency electrical energy, and an audio circuit connected to the output of said second filter and said second source of audio frequency energy.

2. A photo-electric processing system according to claim 1 wherein said first filter is a narrow bandpass filter.

3. A photo-electric processing system according to claim 1 wherein said first filter is an active filter having a narrow passband.

4. A photo-electric processing system according to claim 1 wherein said second filter is a narrow band filter centered on the spin frequency of the missile.

5. A photo-electric processing system according to claim 3 wherein said second filter is a narrow band filter centered on the spin frequency of the missile.

6. A photo-electric processing system according to claim 1 wherein said audio circuit includes:

a pulse width modulator having an input connected to said second filter and an output.

an amplifier having a first input connected to said pulse width modulator and a second input connected to said second source of audio frequency.

7. A photo-electric processing system according to claim 5 wherein said audio circuit includes:

a pulse width modulator having an input connected to said second filter and an output.

an amplifier having a first input connected to said pulse width modulator and a second input connected to said second source of audio frequency.

8. A photo-electric processing system according to claim 1 wherein said processing circuit further includes a squelch circuit connected to said audio circuit selectively suppressing the output thereof.

9. A photo-electric processing system according to claim 7 wherein said processing circuit further includes a squelch circuit connected to said audio circuit selectively suppressing the output thereof.

10. A photo-electric processing circuit according to claim 8 wherein said squelch circuit is also connected to said second filter.

* * * * *